US012159490B2

(12) United States Patent
Hayashida et al.

(10) Patent No.: US 12,159,490 B2
(45) Date of Patent: Dec. 3, 2024

(54) VEHICLE MANAGEMENT SYSTEM

(71) Applicants: TOYOTA JIDOSHA KABUSHIKI KAISHA, Toyota (JP); DENSO CORPORATION, Kariya (JP)

(72) Inventors: Miyako Hayashida, Miyoshi (JP); Toshinari Ogawa, Nagoya (JP); Kosuke Fujimoto, Nisshin (JP); Hideo Hasegawa, Nagoya (JP); Shintaro Matsutani, Kariya (JP); Yosuke Nozaki, Toyota (JP); Tatsuya Matsunami, Nisshin (JP); Takashi Hayashi, Togo-cho (JP); Tomoya Makino, Kariya (JP); Yohei Tanigawa, Toyota (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 362 days.

(21) Appl. No.: 17/163,641

(22) Filed: Feb. 1, 2021

(65) Prior Publication Data

US 2021/0241545 A1 Aug. 5, 2021

(30) Foreign Application Priority Data

Feb. 3, 2020 (JP) ................................ 2020-016504

(51) Int. Cl.
*G07C 5/00* (2006.01)
*G07C 5/08* (2006.01)

(52) U.S. Cl.
CPC ............. *G07C 5/006* (2013.01); *G07C 5/008* (2013.01); *G07C 5/0808* (2013.01); *G07C 5/0841* (2013.01)

(58) Field of Classification Search
CPC ...... G07C 5/006; G07C 5/008; G07C 5/0808; G07C 5/0841
(Continued)

(56) References Cited

U.S. PATENT DOCUMENTS 6,356,822 B1 * 3/2002 Diaz ...................... G08G 1/205 340/988
8,099,308 B2 * 1/2012 Uyeki .............. G06Q 10/06311 701/31.7
(Continued)

FOREIGN PATENT DOCUMENTS

CN 109765895 A 5/2019
JP 2003-267554 A 9/2003
(Continued)

OTHER PUBLICATIONS

Non-Final Office Action dated Sep. 14, 2023 in U.S. Appl. No. 17/658,033.
(Continued)

*Primary Examiner* — Kurt Philip Liethen
*Assistant Examiner* — John D Bailey
(74) *Attorney, Agent, or Firm* — Oblon, McClelland, Maier & Neustadt, L.L.P.

(57) ABSTRACT

A vehicle management system is provided with an onboard device, a server, and a remote control unit. The onboard device includes first memory and a first processor coupled to the first memory. The first processor being configured to acquire information regarding a vehicle. The server includes second memory and a second processor coupled to the second memory. The second processor being configured to determine whether or not a vehicle maintenance service is required based on the acquired information, and to propose implementation of the vehicle maintenance service in a cases in which the vehicle maintenance service is required.
(Continued)

The remote control unit includes third memory and a third processor coupled to the third memory. The third processor being configured to use remote operation to move the vehicle to a predetermined location for implementation of the vehicle maintenance service in a cases in which the proposed vehicle maintenance service is to be implemented.

6 Claims, 12 Drawing Sheets

(58) Field of Classification Search
USPC .......................................................... 701/29.4
See application file for complete search history.

(56) References Cited

U.S. PATENT DOCUMENTS

| | | | | |
|---|---|---|---|---|
| 9,053,588 | B1 * | 6/2015 | Briggs | G07C 5/006 |
| 9,466,154 | B2 * | 10/2016 | Akselrod | G07C 5/006 |
| 9,646,356 | B1 * | 5/2017 | Schwie | B60W 30/06 |
| 9,665,992 | B2 * | 5/2017 | Akselrod | G06Q 20/102 |
| 9,805,519 | B2 * | 10/2017 | Ramanujam | G06Q 10/06311 |
| 10,049,505 | B1 * | 8/2018 | Harvey | B60R 16/0234 |
| 10,086,782 | B1 * | 10/2018 | Konrardy | B60W 30/16 |
| 10,268,192 | B1 * | 4/2019 | Wengreen | G05D 1/0088 |
| 10,299,216 | B1 * | 5/2019 | Wengreen | H04W 4/02 |
| 10,466,057 | B1 * | 11/2019 | Schwie | G01C 21/3415 |
| 11,060,876 | B2 * | 7/2021 | Akselrod | G01C 21/3691 |
| 2004/0073468 | A1 * | 4/2004 | Vyas | G06Q 10/06315 705/7.38 |
| 2004/0143490 | A1 * | 7/2004 | Kelly | G07B 15/02 705/13 |
| 2005/0273218 | A1 * | 12/2005 | Breed | G06K 7/10178 701/2 |
| 2006/0184295 | A1 * | 8/2006 | Hawkins | G07C 5/008 701/31.4 |
| 2008/0042802 | A1 * | 2/2008 | Shaffer | G07C 5/008 701/2 |
| 2009/0043441 | A1 * | 2/2009 | Breed | G07C 5/085 701/31.9 |
| 2009/0254240 | A1 * | 10/2009 | Olsen, III | G07C 5/008 701/29.5 |
| 2010/0057511 | A1 * | 3/2010 | Mansouri | G05D 1/0088 701/31.4 |
| 2011/0172873 | A1 * | 7/2011 | Szwabowski | G08G 1/0962 701/29.5 |
| 2012/0277949 | A1 * | 11/2012 | Ghimire | G05B 23/0275 701/31.7 |
| 2015/0057875 | A1 * | 2/2015 | McGinnis | G07C 5/0841 701/31.6 |
| 2015/0348335 | A1 * | 12/2015 | Ramanujam | G05D 1/0225 701/23 |
| 2016/0071338 | A1 * | 3/2016 | McQuade | B60K 35/00 701/34.4 |
| 2016/0148439 | A1 * | 5/2016 | Akselrod | G07C 5/085 701/23 |
| 2017/0147959 | A1 * | 5/2017 | Sweeney | G07C 5/008 |
| 2018/0074490 | A1 * | 3/2018 | Park | G05D 1/0027 |
| 2018/0130161 | A1 * | 5/2018 | Wengreen | G06Q 20/12 |
| 2018/0345918 | A1 * | 12/2018 | Foerg | G07F 17/20 |
| 2019/0156598 | A1 * | 5/2019 | Palmer, Jr. | G01N 17/006 |
| 2019/0176845 | A1 * | 6/2019 | Yoon | G06V 20/59 |
| 2019/0197798 | A1 * | 6/2019 | Abari | G06Q 10/02 |
| 2019/0204097 | A1 * | 7/2019 | Starns | G06Q 10/20 |
| 2019/0220035 | A1 * | 7/2019 | Wengreen | G06Q 10/06 |
| 2019/0250616 | A1 * | 8/2019 | Ramanujam | G05D 1/0088 |
| 2019/0378350 | A1 * | 12/2019 | DeRouen | G07C 5/008 |
| 2020/0103239 | A1 * | 4/2020 | Schwie | G08G 1/012 |
| 2020/0118185 | A1 | 4/2020 | Kaneichi et al. | |
| 2021/0070304 | A1 * | 3/2021 | Weldemariam | B60W 40/06 |
| 2021/0097779 | A1 * | 4/2021 | Kaneda | G07C 9/00309 |
| 2021/0114626 | A1 | 4/2021 | Hirose et al. | |
| 2021/0158631 | A1 * | 5/2021 | Kwon | G07C 5/006 |
| 2022/0333941 | A1 | 10/2022 | Okubo et al. | |
| 2023/0249699 | A1 | 8/2023 | Kobayashi et al. | |
| 2023/0249700 | A1 | 8/2023 | Kobayashi et al. | |
| 2023/0251099 | A1 | 8/2023 | Kobayashi et al. | |

FOREIGN PATENT DOCUMENTS

| | | | |
|---|---|---|---|
| JP | 2007-202051 | A | 8/2007 |
| JP | 2015-122107 | A | 7/2015 |
| JP | 2019-109165 | A | 7/2019 |
| JP | 6560814 | B1 | 8/2019 |
| JP | 2019-219842 | A | 12/2019 |
| JP | 2019-220056 | A | 12/2019 |
| JP | 2020-013374 | A | 1/2020 |
| JP | 2020-27522 | A | 2/2020 |
| JP | 2020-95375 | A | 6/2020 |
| JP | 2021-5332 | A | 1/2021 |
| JP | 2021-47606 | A | 3/2021 |
| KR | 10-1767187 | B1 | 8/2017 |
| WO | WO 2019-163194 | A1 | 8/2019 |

OTHER PUBLICATIONS

Notice of Allowance dated Jan. 9, 2024 in U.S. Appl. No. 17/658,033.
Office Action dated May 17, 2024, issued in U.S. Appl. No. 17/658,033.

* cited by examiner

VEHICLE MANAGEMENT SYSTEM

CROSS-REFERENCE TO RELATED APPLICATION

This application is based on and claims priority under 35 USC 119 from Japanese Patent Application No. 2020-016504 filed on Feb. 3, 2020, the disclosure of which is incorporated by reference herein.

BACKGROUND

Technical Field

The present disclosure relates to a vehicle management system, an onboard device, a server, and a remote control unit.

Related Art

Japanese Patent Application Laid-Open (JP-A) No. 2015-122107 discloses an invention relating to a method for providing a car-washing service for leased vehicles.

In this method for providing a car-washing service, a customer identification number associated with a user is acquired by an input terminal provided at a service station of a fuel vendor. Lease contract conditions are referenced based on the customer identification number, and the car-washing service is carried out if the user is eligible for the car-washing service.

However, in the configuration disclosed in JP-A No. 2015-122107, the customer identification number is acquired when the user attends the service station in person, and so the car-washing service can only be provided when the user attends the service station in person. The user must therefore make the effort to visit the service station in person, and it may not be possible to receive the car-washing service in a smooth manner if the service station is busy. This related art therefore leaves room for improvement in this respect.

SUMMARY

In consideration of the above circumstances, an object of the present disclosure is to obtain a vehicle management system capable of enhancing user convenience.

A vehicle management system according to a first aspect includes an acquisition section configured to acquire information regarding a vehicle, a determination section configured to determine whether or not the vehicle maintenance service is required based on the information acquired by the acquisition section, and to propose implementation of the vehicle maintenance service in a cases in which the vehicle maintenance service is required, and a remote operation control section configured to use remote operation to move the vehicle to a predetermined location for implementation of the vehicle maintenance service in a cases in which the vehicle maintenance service proposed by the determination section is to be implemented.

The first aspect includes the acquisition section, the determination section, and the remote operation control section. The acquisition section acquires the information regarding the vehicle. The determination section determines whether or not the vehicle maintenance service is required based on the information regarding the vehicle acquired by the acquisition section. Implementation of the vehicle maintenance service is proposed in a cases in which the determination section determines that the vehicle maintenance service is required. The remote operation control section uses remote operation to move the vehicle to the predetermined location for implementation of the vehicle maintenance service in a cases in which the vehicle maintenance service proposed by the determination section is to be implemented. The user is thus spared the effort of moving the vehicle to the predetermined location when the vehicle maintenance service is required.

Note that "vehicle maintenance services" refer to services designed to maintain the performance, value, and roadworthiness of the vehicle, and include vehicle repairs, upkeep, inspections, refueling, charging, car-washing, and the like.

A vehicle management system according to a second aspect is the configuration of the first aspect, wherein the acquisition section is configured to acquire information regarding usage details of the vehicle and a state of the vehicle, the determination section is configured to determine a low-utilization date/time when a usage frequency of the vehicle is anticipated to be low based on the information regarding the usage details of the vehicle acquired by the acquisition section, to determine whether or not the vehicle maintenance service is required based on the information regarding the state of the vehicle acquired from the acquisition section, and to select the low-utilization date/time as an implementation date/time to implement the vehicle maintenance service in a cases in which the vehicle maintenance service is required, and the remote operation control section is configured to use remote operation to move the vehicle to the predetermined location for implementation of the vehicle maintenance service at the implementation date/time.

According to the second aspect, the determination section determines the low-utilization date/time based on the usage details of the vehicle acquired by the acquisition section. The determination section also determines whether or not a vehicle maintenance service is required based on the information regarding the state of the vehicle acquired by the acquisition section. The determination section then selects the low-utilization date/time as the implementation date/time to implement the vehicle maintenance service in a cases in which the determination section has determined the vehicle maintenance service to be required. The remote operation control section uses remote operation to move the vehicle to the predetermined location for implementation of the vehicle maintenance service at the implementation date/time as selected by the determination section. Accordingly, since the vehicle maintenance service is carried out around the low-utilization date/time as determined from the past usage details of the vehicle, situations in which the vehicle is not available to the user at a time when the user wishes to use the vehicle can be reduced.

A vehicle management system according to a third aspect is the configuration of the second aspect, wherein the determination section is configured to determine an availability state at the predetermined location for implementation of the vehicle maintenance service and to factor the availability state into decision-making when selecting the implementation date/time.

According to the third aspect, the determination section determines the availability of the predetermined location for implementation of the vehicle maintenance service, and this availability is factored into decision-making by the determination section when selecting the implementation date/time. This enables queues for vehicle maintenance services to be suppressed, and thus enables the amount of time required in order to receive the vehicle maintenance service to be kept as short as possible while also contributing to smoothing of the workload at the predetermined location for implementation of the vehicle maintenance service.

A vehicle management system according to a fourth second aspect is the configuration of either the second aspect or the third aspect, further including a plan registration section that allows a user of the vehicle to pre-register a usage plan of the vehicle, wherein the determination section is configured to factor the registered usage plan into decision-making when selecting the implementation date/time.

According to the fourth aspect, since the determination section selects the implementation date/time of the vehicle maintenance service so as to take into account the usage plan of the vehicle that has been pre-registered in the plan registration section by the user of the vehicle, a situation in which the vehicle is not available when the user wishes to use the vehicle can be avoided. Moreover, selecting the implementation dates/times of vehicle maintenance services so as to prioritize vehicles with more imminent usage plans enables efficient administration.

A vehicle management system according to a fifth aspect is the configuration of any one of the second aspect to the fourth aspect, wherein the determination section is configured to acquire historical date/time information regarding when the vehicle maintenance service was carried out on the vehicle, and to factor the historical date/time information into decision-making when selecting the implementation date/time for respective vehicles in a cases in which the vehicle management system covers plural of the vehicles.

According to the fifth aspect, in a cases in which plural of the vehicles are covered, the determination section acquires the historical date/time information regarding when the vehicle maintenance service was carried out on the respective vehicles, and takes the historical date/time information into account when selecting the implementation date/time for the vehicle maintenance service, thereby enabling vehicles for which the previous vehicle maintenance service implementation date/time is further in the past to be prioritized for vehicle maintenance service implementation. This enables vehicle maintenance service implementation to be balanced evenly between the plural vehicles.

A vehicle management system according to a sixth aspect is the configuration of any one of the second aspect to the fifth aspect, wherein the determination section is configured to factor weather information acquired by a weather acquisition unit for acquiring weather information for a current location of the vehicle into decision-making when selecting the implementation date/time.

According to the sixth aspect, the determination section factors the weather information acquired for the current location of the vehicle by the weather acquisition unit into decision-making when selecting the implementation date/time for the vehicle maintenance service. This enables the vehicle maintenance service required by the vehicle to be implemented at an appropriate timing according to the weather. As a rule, the exterior of the vehicle will often get dirty when traveling in the rain. Due to the determination section making a selection so as to carry out car washing after the precipitation has ended and by then carrying out this car washing, the vehicle can be kept clean.

A vehicle management system according to a seventh aspect is the configuration of any one of the first aspect to the sixth aspect, wherein the remote operation control section is capable of remotely operating opening and closing of a door that opens and closes a vehicle entrance of a storage facility for the vehicle.

According to the seventh aspect, the remote operation control section is capable of remotely operating opening and closing of the door that opens and closes the vehicle entrance of the storage facility for the vehicle. This enables the vehicle maintenance service to be implemented even in a cases in which, for example, the user has gone out and is not near the vehicle.

A vehicle management system according to an eighth aspect is the configuration of any one of the first aspect to the seventh aspect, wherein the remote operation control section is configured to permit a manual driving operation of the vehicle at the predetermined location as required.

According to the eighth aspect, the remote operation control section permits the manual driving operation of the vehicle when this is required at the predetermined location where the vehicle maintenance service is carried out, thus enabling cases in which it is more appropriate for a vehicle maintenance service task to be carried out by an on-site technician performing a manual driving operation to be accommodated.

The vehicle management system according to the first aspect exhibits the excellent advantageous effect of enabling user convenience to be enhanced.

The vehicle management systems according to the second aspect and the third aspect exhibit the excellent advantageous effect of enabling user convenience to be further enhanced.

The vehicle management system according to the fourth aspect exhibits the excellent advantageous effect of enabling the vehicle maintenance service to be carried out efficiently.

The vehicle management system according to the fifth aspect exhibits the excellent advantageous effect of enabling the vehicle maintenance service to be provided in an appropriate manner for plural vehicles.

The vehicle management system according to the sixth aspect exhibits the excellent advantageous effect of enabling the vehicle to be maintained in a desirable state.

The vehicle management system according to the seventh aspect exhibits the excellent advantageous effect of enabling user convenience to be even further enhanced.

The vehicle management system according to the eighth aspect exhibits the excellent advantageous effect of enabling the vehicle maintenance service to be carried out even more efficiently.

BRIEF DESCRIPTION OF THE DRAWINGS

Exemplary embodiments of the present invention will be described in detail based on the following figures, wherein.

DETAILED DESCRIPTION

Explanation follows regarding a first exemplary embodiment of a vehicle management system 10 according to the present disclosure, with reference to FIG. 1 to FIG. 8.

Figure 1:
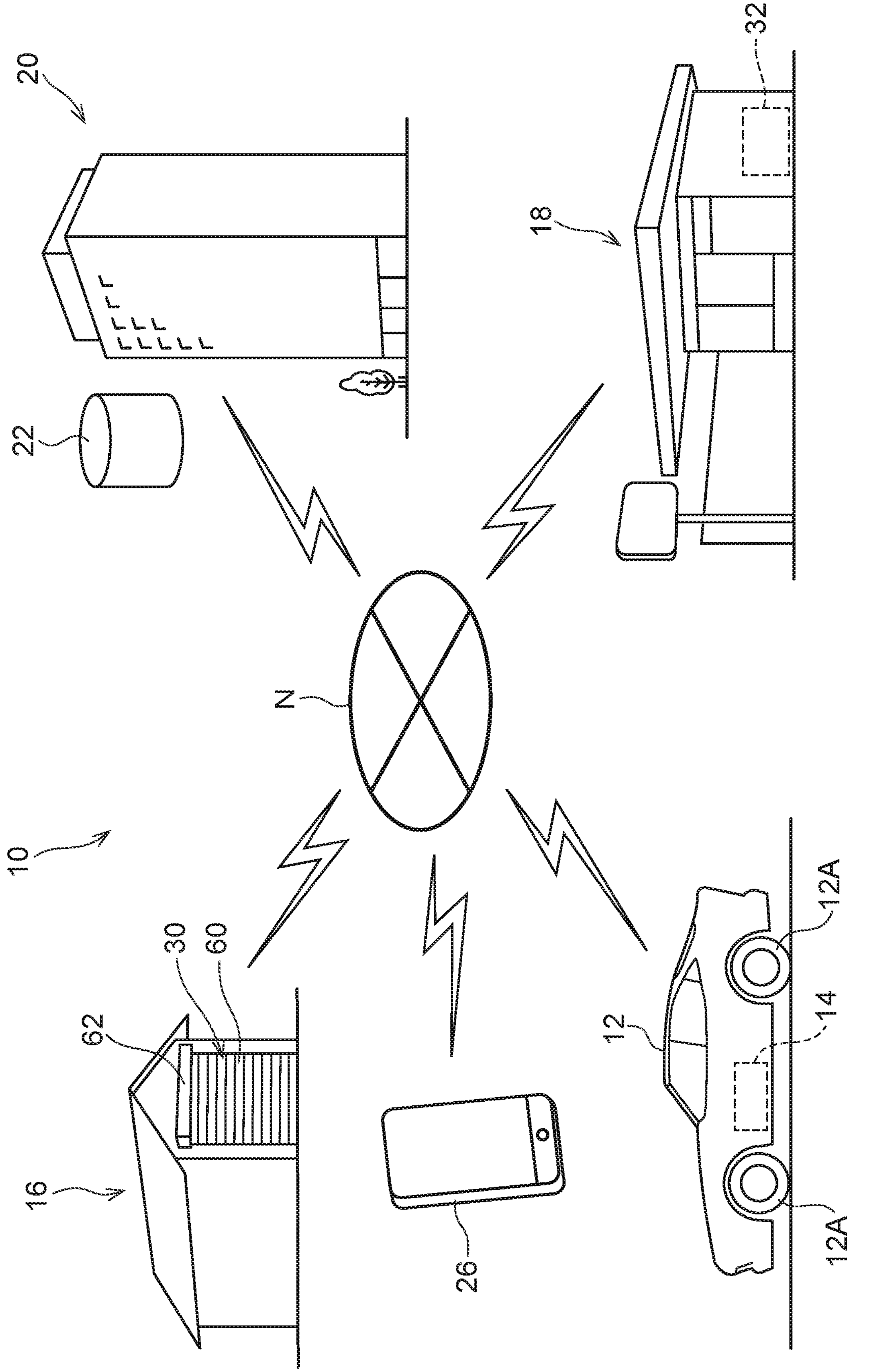
FIG. 1 is a schematic diagram illustrating a vehicle management system according to a first exemplary embodiment.

FIG. 1 is a diagram illustrating a schematic configuration of the vehicle management system 10 according to the first exemplary embodiment.

As illustrated in FIG. 1, the vehicle management system 10 is configured including an onboard device 14 installed in a vehicle 12, a garage 16 serving as a storage facility for the vehicle 12, a user terminal device 26, a gas station 18 serving as a predetermined location where a vehicle maintenance service is carried out, a control center 20, and a server 22. The onboard device 14, the garage 16, the user terminal device 26, the gas station 18, the control center 20, and the server 22 are connected together through a network N so as to be capable of communicating with each other. The network N may, for example, be configured by the internet or a wide area network (WAN).

As an example, the vehicle 12 is a private vehicle owned by a user, not illustrated in the drawings. The vehicle 12 is capable of being driven by manual operation using an operation interface 28 (see FIG. 2) in the vehicle and also capable of being driven by remote operation from the control center 20, using images from an imaging device 29 (see FIG. 2). The onboard device 14 is capable of transmitting information regarding a usage details and vehicle states of the vehicle 12 to the externally-provided server 22. Specific configuration and operation of the onboard device 14 will be described later.

The garage 16 is, for example, provided at the residence of the user who owns the vehicle 12, and the vehicle 12 is capable of being housed within the garage 16. The garage 16 is provided with a shutter 30 serving as a door that opens and closes an entrance used by the vehicle 12. Opening and closing of the shutter 30 can be performed by remote operation from the control center 20. Specific configuration and operation of the shutter 30 will be described later.

The user terminal device 26 may, for example, be a smartphone, mobile telephone, tablet, or personal computer, and is in the possession of the user of the vehicle 12. Specific configuration and operation of the user terminal device 26 will be described later.

Vehicle maintenance services, specifically including fuel vending, car washing, and upkeep of the vehicle 12, can be carried out at the gas station 18. A service management unit 32 is provided at the gas station 18. Specific configuration and operation of the service management unit 32 will be described later.

An operation interface 34 used to remotely operate the vehicle 12, a remote operation control unit 36, a display device 38 (see FIG. 5), and the server 22 are provided at the control center 20 (the server 22 and the control center 20 are illustrated separately in FIG. 1 to aid understanding of the relevant configurations). The server 22 gathers various information from the onboard device 14, the shutter 30, the service management unit 32, and the remote operation control unit 36, manages the gathered information in a database, and performs transmission of various information. Specific configuration and operation of the operation interface 34, the remote operation control unit 36, the display device 38, and the server 22 will be described later.

Figure 2:
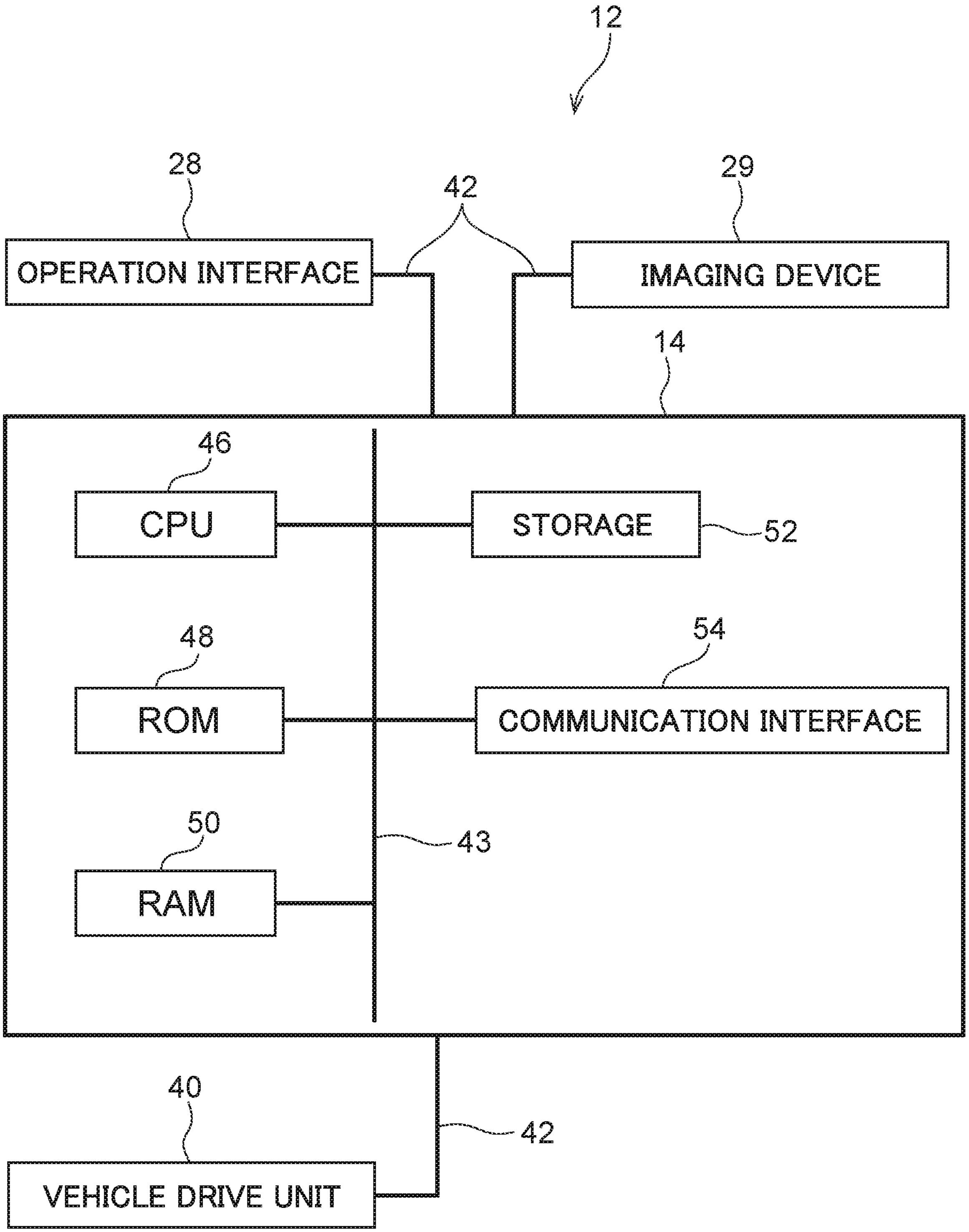
FIG. 2 is a block diagram illustrating a hardware configuration of a vehicle of a vehicle management system according to the first exemplary embodiment.

As illustrated in FIG. 2, the vehicle 12 includes the operation interface 28, the onboard device 14, and a vehicle drive unit 40. These configurations are connected together through a bus 42 so as to be capable of communicating with each other.

The operation interface 28 is disposed at the vehicle front side of a cabin of the vehicle 12, and is configured including a steering wheel, an accelerator pedal, a brake pedal, and a gear shift lever (none of which are illustrated in the drawings). The operation interface 28 is connected to an occupant operation information acquisition section 44 (see FIG. 7) of the onboard device 14, described later.

As an example, the imaging device 29 is provided inside the cabin of the vehicle 12, and is configured to image the scene outside the vehicle, centered on the front side of the vehicle 12. The captured images are sent to the onboard device 14.

The onboard device 14 is configured including a central processing unit (CPU) 46, read only memory (ROM) 48, random access memory (RAM) 50, storage 52, and a communication interface 54. These configurations are connected together through a bus 43 so as to be capable of communicating with each other. The CPU 46 of the onboard device 14 is an example of a first processor, and the RAM 50 is an example of first memory.

The CPU 46 is a central processing unit that executes various programs and controls various sections. Namely, the CPU 46 reads the program from the ROM 48 or the storage 52, and executes the program using the RAM 50 as a workspace. The CPU 46 controls the various configurations described above and performs arithmetic processing in accordance with the program recorded in the ROM 48 or the storage 52. In the present exemplary embodiment, a vehicle management program is held in the ROM 48 or the storage 52.

The ROM 48 holds various programs and various data. The RAM 50 serves at as a workspace in which programs and data are temporarily stored. The storage 52 is configured by a hard disk drive (HDD) or a solid state drive (SSD), and holds various programs including an operating system, as well as various data.

The communication interface 54 is an interface used by the onboard device 14 to communicate with the server 22, and may employ a protocol such as Ethernet (registered trademark), FDDI, or Wi-Fi (registered trademark).

The vehicle drive unit 40 actuates a non-illustrated engine to drive wheels 12A (see FIG. 1) of the vehicle 12 under the control of the onboard device 14.

Figure 4:
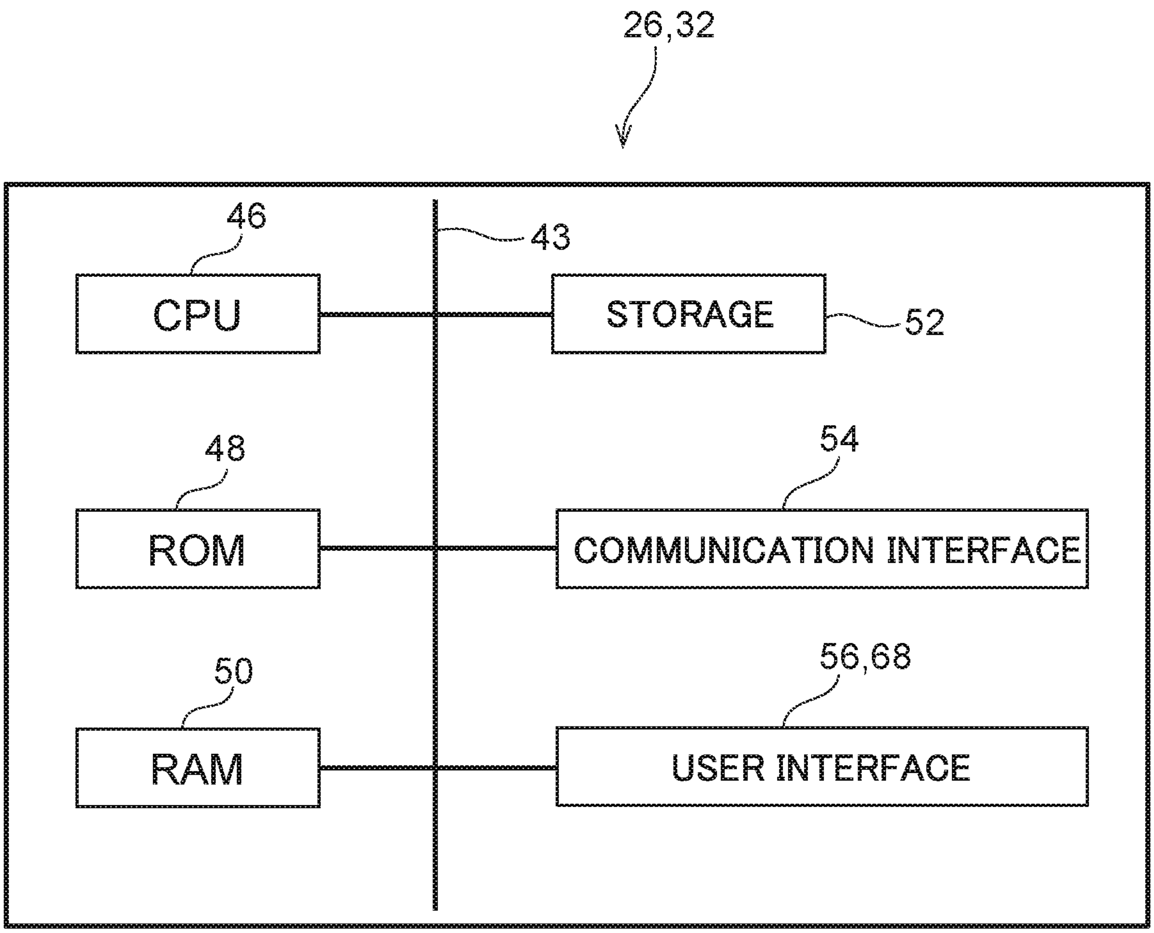
FIG. 4 is a block diagram illustrating hardware configurations of a gas station and a user terminal device of a vehicle management system according to the first exemplary embodiment.

As illustrated in FIG. 4, the user terminal device 26 is configured including a CPU 46, ROM 48, RAM 50, storage 52, a communication interface 54 and a user interface 56.

These configurations are connected together through a bus 43 so as to be capable of communicating with each other. The user interface 56 is an interface used by the user to input usage plans for the vehicle 12, and to display information transmitted from the server 22. Specifically, the user interface 56 includes at least one out of a liquid crystal display provided with a touch panel capable of receiving touch operation by the user, an audio input section to receive audio input from the user, a user-operable push button, or the like.

Figure 3:
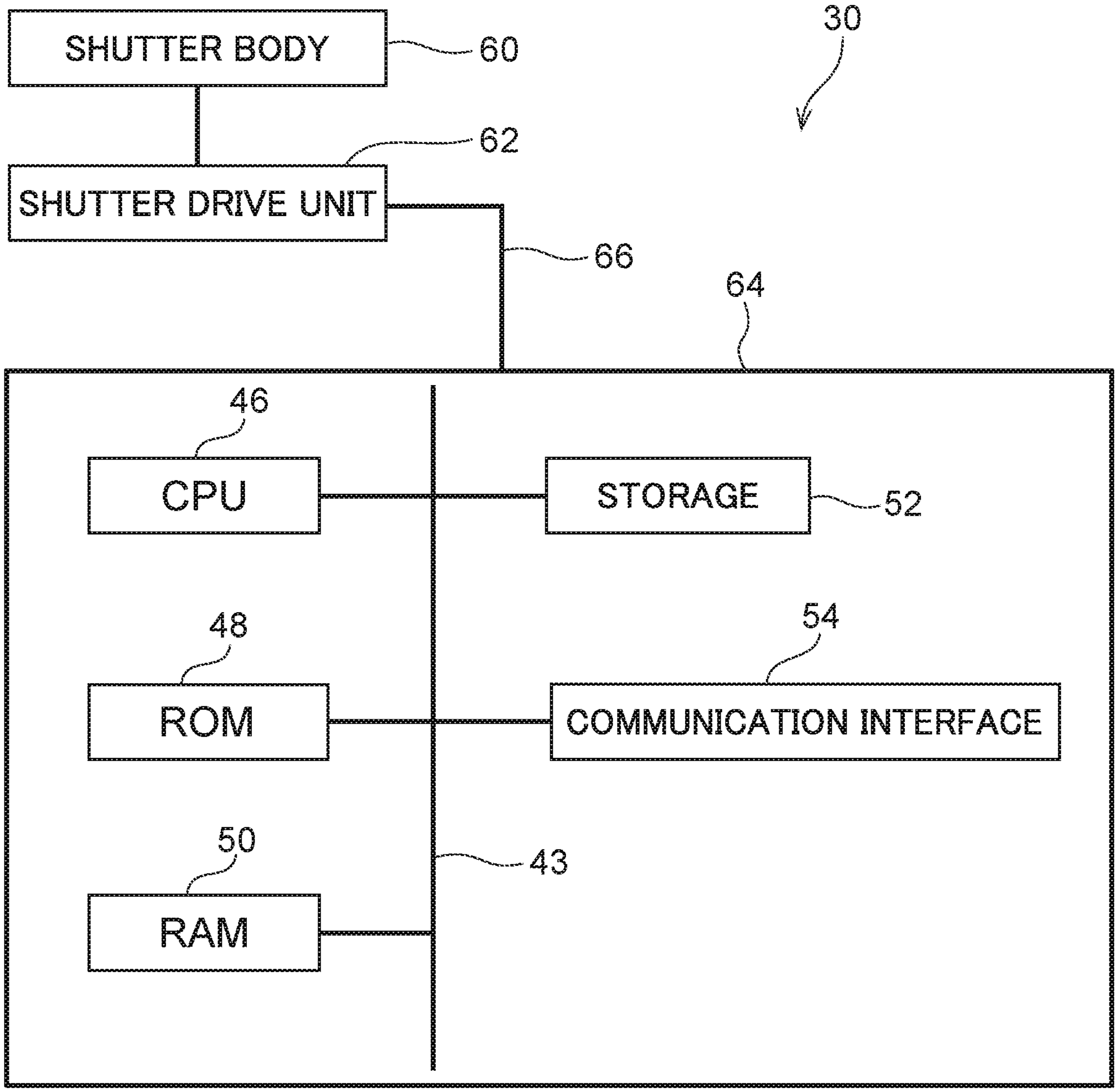
FIG. 3 is a block diagram illustrating a hardware configuration of a shutter of a vehicle management system according to the first exemplary embodiment.

As illustrated in FIG. 3, the shutter 30 includes a shutter body 60, a shutter drive unit 62, and a shutter drive control unit 64. As an example, the shutter body 60 moves in an up-down direction across the entrance of the garage 16 so as to open and close the entrance. Namely, the shutter body 60 is taken up by the shutter drive unit 62 provided at an upper section of the garage 16 (see FIG. 1) in order to open the entrance. The shutter drive unit 62 is connected to the shutter drive control unit 64 through a bus 66 so as to be capable of communicating therewith.

The shutter drive control unit 64 is configured including a CPU 46, ROM 48, RAM 50, storage 52, and a communication interface 54. These configurations are connected together through a bus 43 so as to be capable of communicating with each other.

As illustrated in FIG. 4, the service management unit 32 is configured including a CPU 46, ROM 48, RAM 50, storage 52, a communication interface 54, and a user interface 68. These configurations are connected together through a bus 43 so as to be capable of communicating with each other. The user interface 68 is an interface used to input a task schedule of a gas station 18 technician, switch between manual driving operation and remote operation, and input task completion and the like for vehicle maintenance services performed at the gas station 18. Specifically, the user interface 68 includes at least one out of a liquid crystal display provided with a touch panel capable of being touch operated by the technician, an audio input section to receive audio input from the technician, a technician-operable push button, or the like.

Figure 5:
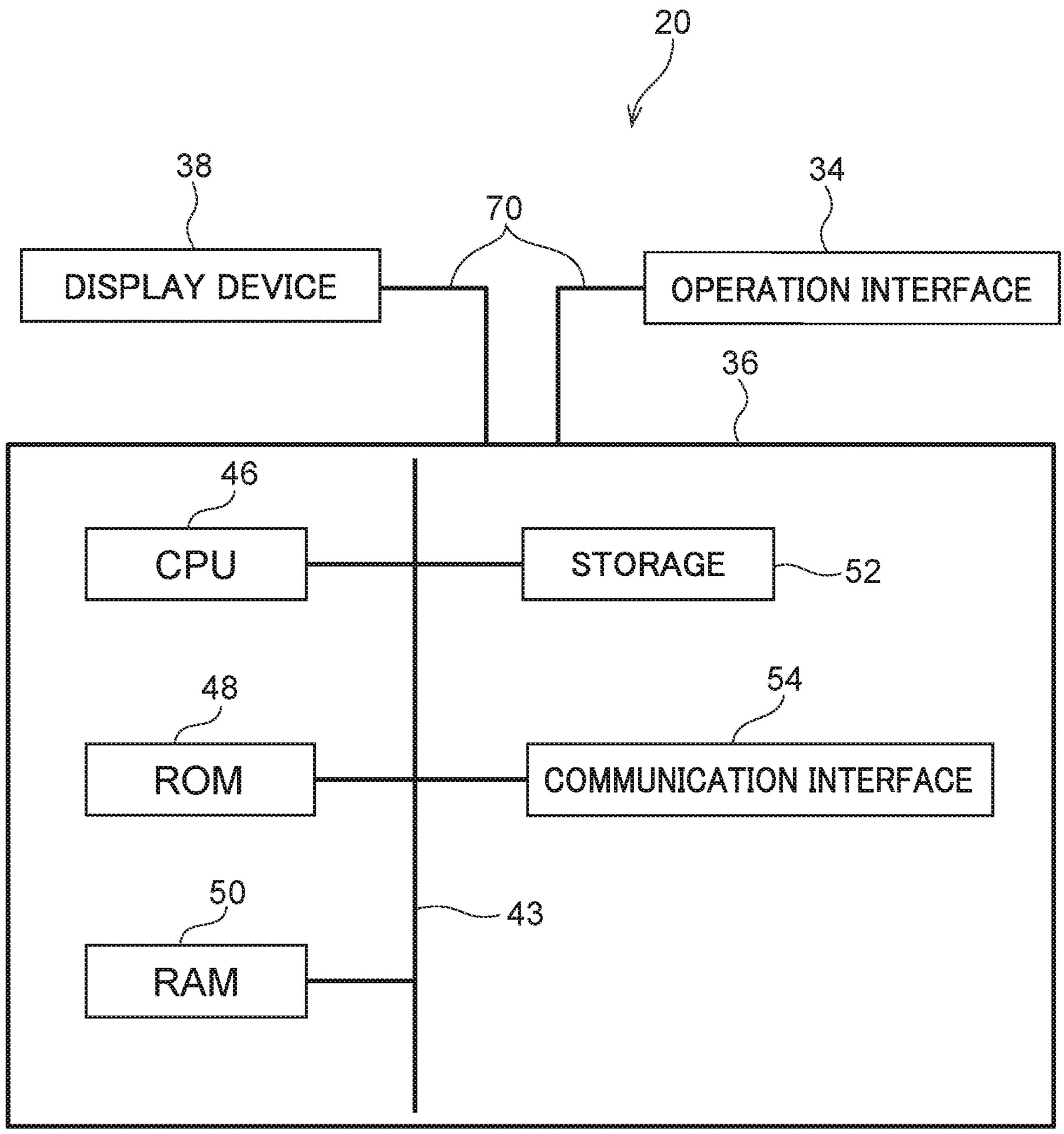
FIG. 5 is a block diagram illustrating a hardware configuration of a control center of a vehicle management system according to the first exemplary embodiment.

As illustrated in FIG. 5, the operation interface 34, the display device 38, and the remote operation control unit 36 at the control center 20 are connected together through a bus 70 so as to be capable of communicating with each other. As an example, the operation interface 34 is configured including a keyboard, mouse, joystick, or the like (none of which are illustrated in the drawings), and is provided for an operator to perform remote operation of the vehicle 12. Note that the operation interface 34 may be configured including controllers simulating a steering wheel, an accelerator pedal, a brake pedal, and a gear shift lever (none of which are illustrated in the drawings).

The remote operation control unit 36 is configured including a CPU 46, ROM 48, RAM 50, storage 52, and a communication interface 54. These configurations are connected together through a bus 43 so as to be capable of communicating with each other. The remote operation control unit 36 transmits operation information for remote operation of the vehicle 12 input using the operation interface 34 to the server 22. The CPU 46 of the remote operation control unit 36 is an example of a third processor, and the RAM 50 is an example of third memory.

The display device 38 is configured by a display that displays information received from the server 22. Specifically, the display device 38 is capable of displaying images from the periphery of the vehicle 12 and calendar information such as dates/times for implementing vehicle maintenance services.

Figure 6:
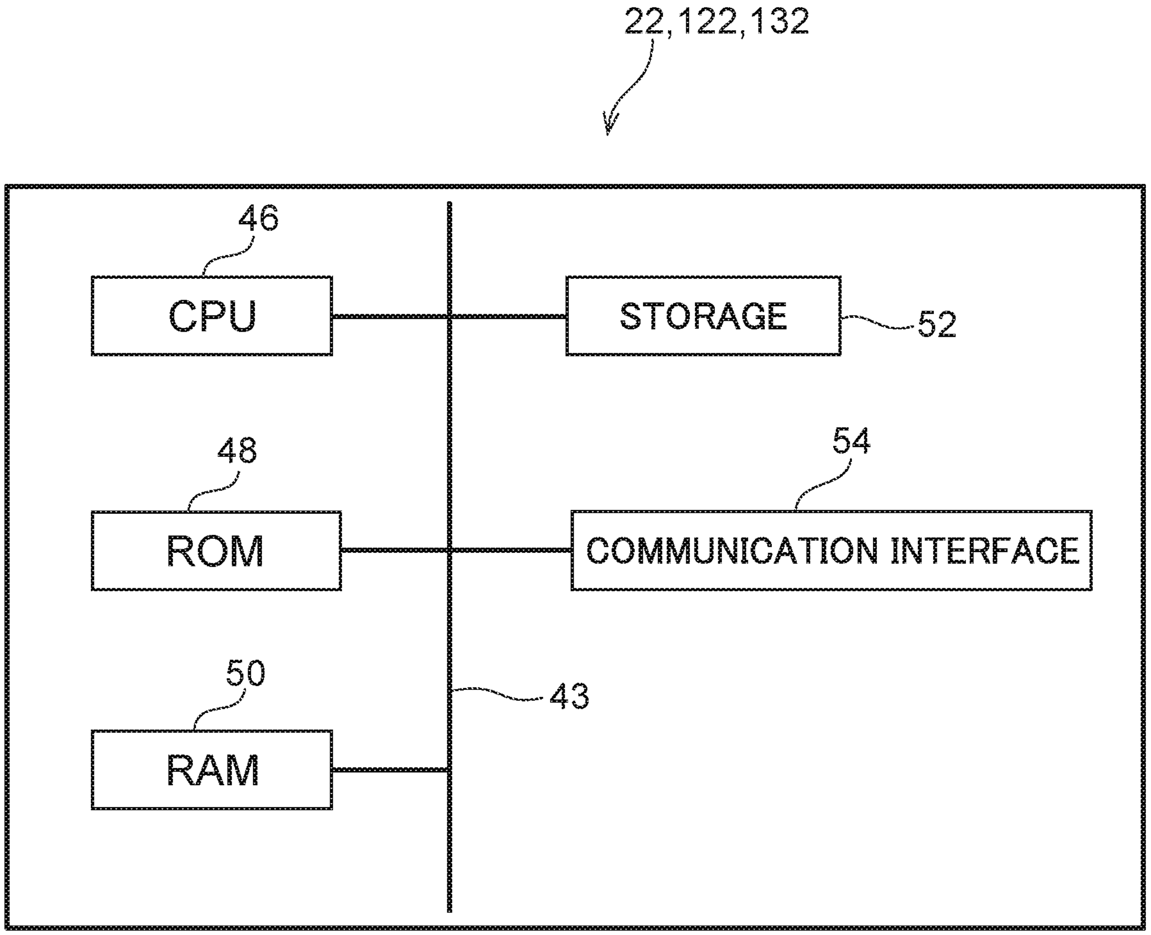
FIG. 6 is a block diagram illustrating a hardware configuration of a server of a vehicle management system according to the first exemplary embodiment.

As illustrated in FIG. 6, the server 22 is configured including a CPU 46, ROM 48, RAM 50, storage 52, and a communication interface 54. These configurations are connected together through a bus 43 so as to be capable of communicating with each other. The CPU 46 of the server 22 is an example of a second processor, and the RAM 50 is an example of second memory.

During execution of the vehicle management program mentioned above, the vehicle management system 10 implements various functionality using the hardware resources described above. Explanation follows regarding the functional configurations implemented by the vehicle management system 10.

Figure 7:
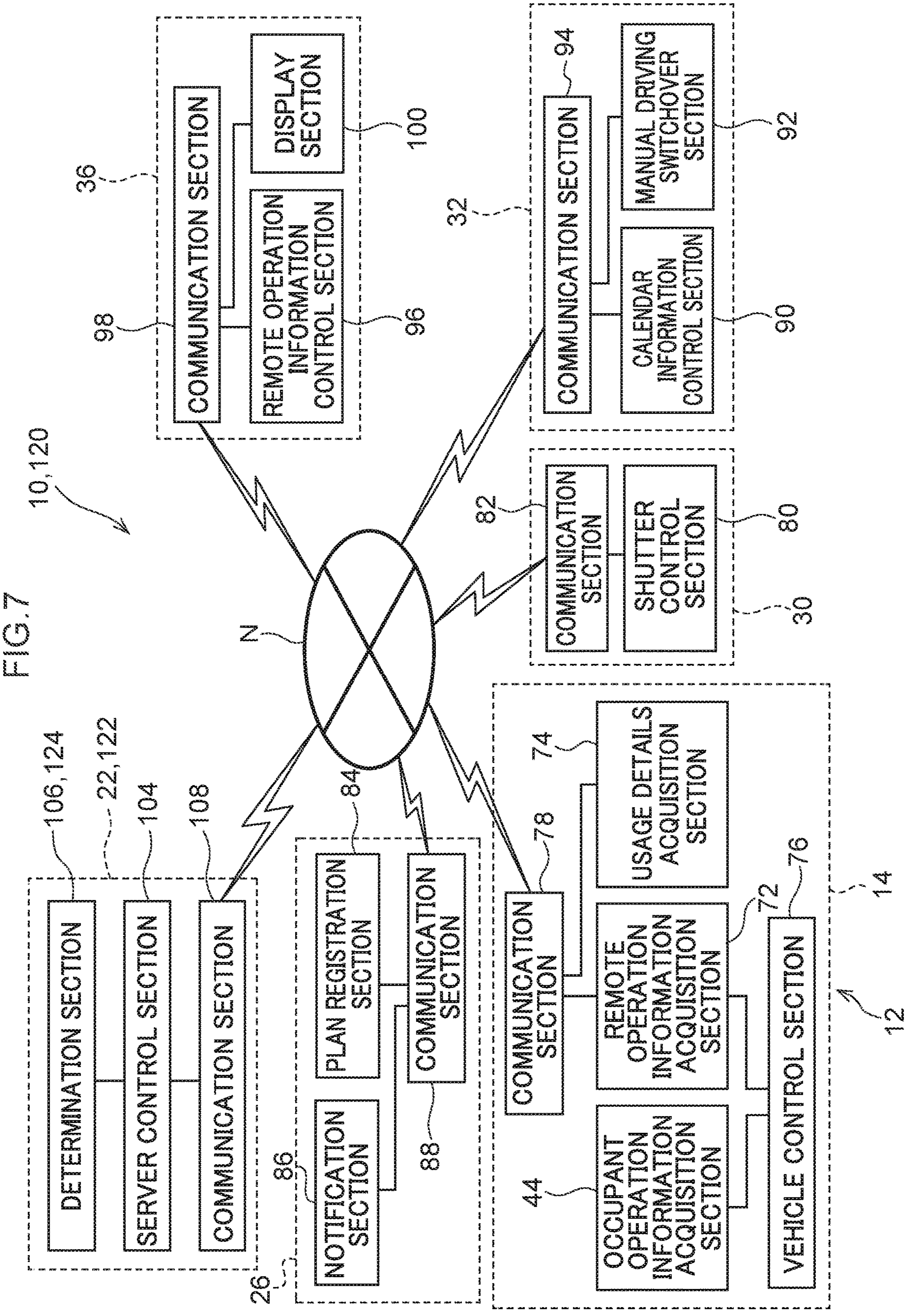
FIG. 7 is a block diagram illustrating functional configurations of a vehicle management system according to the first exemplary embodiment and a vehicle management system according to a second exemplary embodiment.

FIG. 7 is a block diagram illustrating an example of functional configurations of the vehicle management system 10.

As illustrated in FIG. 7, functional configurations of the vehicle 12 of the vehicle management system 10 include the occupant operation information acquisition section 44, a remote operation information acquisition section 72, a usage details acquisition section 74, serving as an acquisition section, a vehicle control section 76, and a communication section 78. This respective functionality is implemented by the CPU 46 of the onboard device 14 reading and executing the vehicle management program stored in the ROM 48 or the storage 52.

The occupant operation information acquisition section 44 acquires operation information input to the operation interface 28 by an occupant on board the vehicle 12.

The remote operation information acquisition section 72 controls the communication section 78 so as to acquire operation information transmitted from the remote operation control unit 36 via the server 22. The operation information transmitted from the remote operation control unit 36 is operation information that has been input to the operation interface 34 (see FIG. 5) by the operator at the control center 20.

The vehicle control section 76 controls driving of the vehicle drive unit 40 (see FIG. 2) based on the operation information acquired by the occupant operation information acquisition section 44 or by the remote operation information acquisition section 72. Note that when the vehicle control section 76 has acquired operation information from the remote operation information acquisition section 72, the vehicle control section 76 controls the vehicle drive unit 40 based on the operation information from the remote operation information acquisition section 72, and in the event that an abnormality arises or a task needs to be implemented the vehicle control section 76 controls the vehicle drive unit 40 based on the operation information from the occupant operation information acquisition section 44.

The usage details acquisition section 74 acquires various information from various sensors provided to the vehicle 12, such as a travel history including dates and times, a total distance traveled, a remaining fuel level, various oil levels, tire pressures, and the like. The usage details acquisition section 74 also controls the communication section 78 in order to transmit this various information to the server 22.

The communication section 78 exchanges information with other devices.

Functional configurations of the shutter 30 of the vehicle management system 10 include a shutter control section 80 and a communication section 82. These functional configurations are implemented by the CPU 46 of the shutter drive control unit 64 (see FIG. 3) reading and executing a vehicle management program stored in the ROM 48 or the storage 52.

The shutter control section 80 controls the communication section 82 in order to transmit a state of the shutter 30 to the server 22, and also controls the communication section 82 so as to acquire operation information transmitted from the remote operation control unit 36 via the server 22. The shutter control section 80 controls opening and closing of the shutter 30 based on the acquired operation information.

The communication section 82 exchanges information with other devices.

Functional configurations of the user terminal device 26 of the vehicle management system 10 include a plan registration section 84, a notification section 86, and a communication section 88. These functional configurations are implemented by the CPU 46 of the user terminal device 26 reading and executing a vehicle management program stored in the ROM 48 or the storage 52.

The plan registration section 84 acquires usage plan dates/times for the vehicle 12 as input by a user, and controls the communication section 88 in order to transmit information regarding these usage plan dates/times to the server 22.

The notification section 86 notifies the user of an implementation date/time transmitted from the server 22, acquires information regarding the consent or non-consent of the user to implementation of a vehicle maintenance service at the implementation date/time, and controls the communication section 88 in order to transmit this information to the server 22.

The communication section 88 exchanges information with other devices.

Functional configurations of the service management unit 32 of the vehicle management system 10 include a calendar information control section 90, a manual driving switchover section 92, and a communication section 94. These functional configurations are implemented by the CPU 46 of the service management unit 32 reading and executing a vehicle management program stored in the ROM 48 or the storage 52.

The calendar information control section 90 performs schedule management for vehicle maintenance services implemented at the gas station 18 where the service management unit 32 is provided, and controls the communication section 94 in order to transmit information regarding this schedule to the server 22.

The manual driving switchover section 92 acquires switchover request information for switching the vehicle 12 to either one out of remote operation or manual driving operation when on the premises of the gas station 18, and controls the communication section 94 in order to transmit this switchover request information to the server 22.

The communication section 94 exchanges information with other devices.

Functional configurations of the remote operation control unit 36 of the vehicle management system 10 include a remote operation information control section 96 serving as a remote operation control section, a communication section 98, and a display section 100. These functional configurations are implemented by the CPU 46 of the remote operation control unit 36 reading and executing a vehicle management program stored in the ROM 48 or the storage 52.

The remote operation information control section 96 serving as a remote operation control section acquires operation information from the operation interface 34 (see FIG. 5), and controls the communication section 98 in order to transmit this operation information to the server 22.

The display section 100 controls the display device 38 (see FIG. 5) in order to display information received from the server 22, implementation date/time notifications, and the like to an operator.

Functional configurations of the server 22 of the vehicle management system 10 include a server control section 104, a determination section 106, and a communication section 108. These functional configurations are implemented by the CPU 46 of the server 22 reading and executing a vehicle management program stored in the ROM 48 or the storage 52.

The server control section 104 controls the server 22. For example, the server control section 104 controls the communication section 108 in order to acquire peripheral images transmitted from the vehicle 12 and transmit these images to the control center 20. The server control section 104 also controls the communication section 108 in order to transmit the various information acquired from the vehicle 12, the garage 16, the user terminal device 26, and the gas station 18 to the determination section 106, and transmit the implementation dates/times information from the determination section 106 to the user terminal device 26.

The determination section 106 determines whether or not a vehicle maintenance service is required by the vehicle 12 based on the various information acquired from the server control section 104. As an example, the determination section 106 determines a refueling vehicle maintenance service to be required in a cases in which the remaining fuel level of the vehicle 12 is low.

The determination section 106 determines low-utilization dates/times at which the usage frequency of the vehicle 12 is anticipated to be low. Namely, in a cases in which the vehicle 12 is predominantly used on specific days of the week, for example at weekends, other days of the week, for example weekdays, are determined to be low-utilization dates/times. Moreover, in a cases in which the vehicle 12 has been determined to require a vehicle maintenance service, the determination section 106 also determines schedule availability of the gas station 18 from various information acquired from the server 22. The determination section 106 then selects a date/time that is a low-utilization date/time of the vehicle 12 and outside of any usage plan dates/times input by the user of the vehicle 12, and that also coincides with availability at the gas station 18, as an implementation date/time for the vehicle maintenance service. This implementation date/time is then transmitted to the server control section 104. Note that the determination section 106 is pre-registered with required durations (hereafter, referred to simply as task durations) for implementing various vehicle maintenance services, and selects each implementation date/time in consideration of the task duration. The determination section 106 causes the display section 100 to display that the vehicle maintenance service will be carried out at the implementation date/time in a cases in which the user has given their consent to the selected implementation date/time using the user terminal device 26. On the other hand, in a cases in which the user does not give their consent to the selected implementation date/time, an alternative implementation date/time is selected and the user is notified of this. This processing is repeated until the consent of the user can be obtained.

Figure 8:
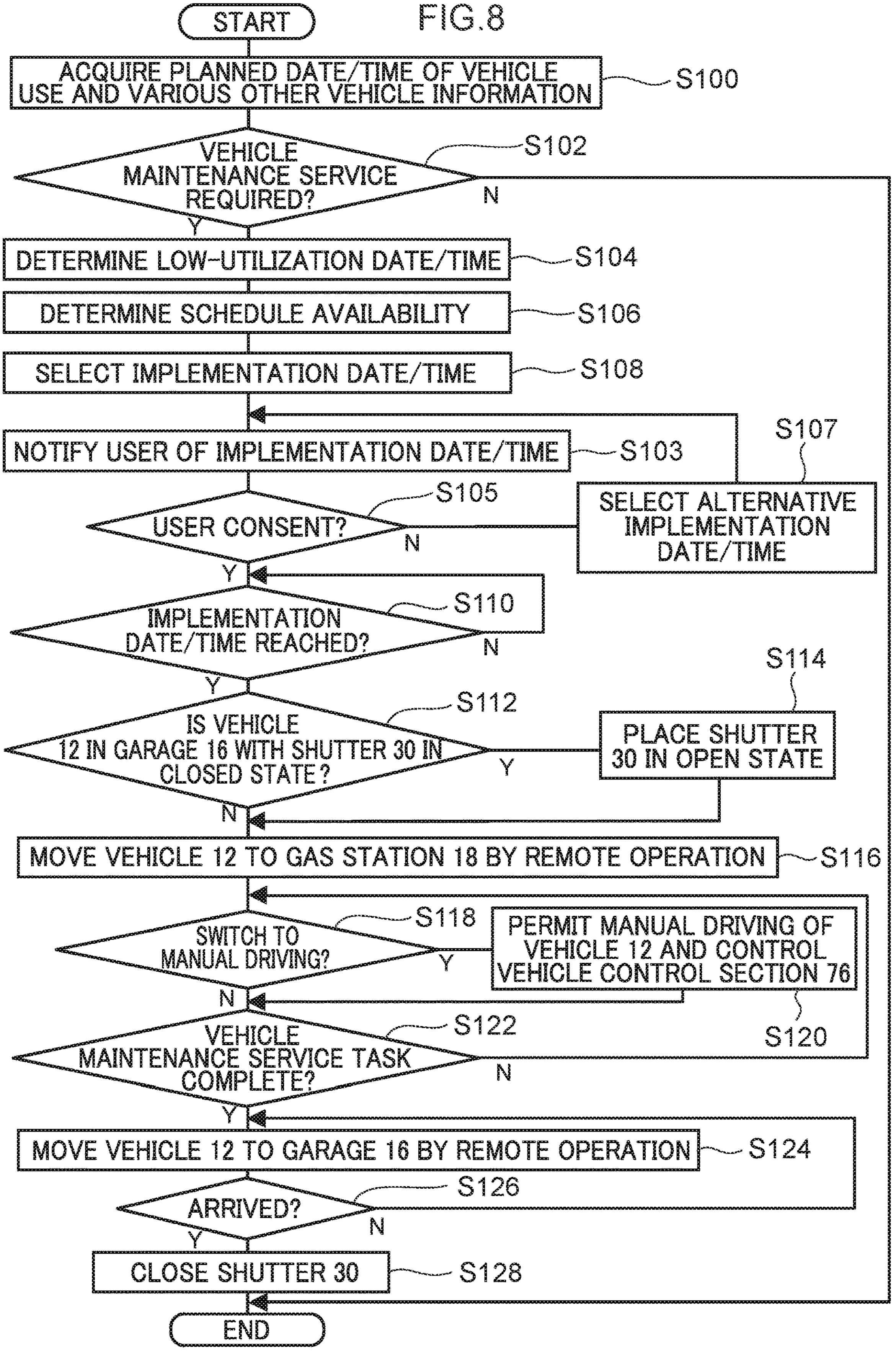
FIG. 8 is a flowchart illustrating a flow of operation of a vehicle management system according to the first exemplary embodiment.

Next, explanation follows regarding operation of the vehicle management system 10. FIG. 8 is a flowchart illustrating a flow of operation of the vehicle management system 10. The onboard device 14, the shutter drive control unit 64, the user terminal device 26, the service management unit 32, the remote operation control unit 36, and the server 22 perform their respective processing by using their respective CPUs 46 to read the vehicle management program from the corresponding ROM 48 or storage 52, and expand and execute this program in the RAM 50.

The CPU 46 acquires various information from the vehicle 12 and a vehicle usage plan date/time of the user from the user terminal device 26 (step S100). The CPU 46 determines whether or not the vehicle 12 requires a vehicle maintenance service based on the various acquired information (step S102). In a cases in which a vehicle maintenance service is not required (step S102: NO), the CPU 46 ends the processing based on the vehicle management program.

In a cases in which a vehicle maintenance service is required (step S102: YES), the CPU 46 determines a low-utilization date/time of the vehicle 12 (step S104), and determines schedule availability at the gas station 18 (step S106) in order to select an implementation date/time for the vehicle maintenance service that is a date/time when there is availability at the gas station 18 and is also outside of any dates/times at which the user plans to use the vehicle (step S108).

The CPU 46 then notifies the user terminal device 26 of the selected implementation date/time (step S103), and determines whether or not the user has given their consent to this implementation date/time (step S105). In a cases in which the user has not given their consent to the notified implementation date/time (step S105: NO), the CPU 46 selects an alternative implementation date/time (step S107), after which processing returns to step S103.

In a cases in which the user has given their consent to the notified implementation date/time (step S105: YES), the CPU 46 determines whether or not the current date/time have reached the implementation date/time (step S110). In a cases in which the current date/time have not reached the implementation date/time (step S110: NO), the CPU 46 repeats the processing of step S110. On the other hand, in a cases in which the current date/time have reached the implementation date/time, (step S110: YES), the CPU 46 determines whether or not the vehicle 12 is in the garage 16 with the shutter 30 in a closed state (step S112). In a cases in which the vehicle 12 is in the garage 16 with the shutter 30 in an open state, or in a cases in which the vehicle 12 is outside the garage 16 (step S112: NO), the CPU 46 uses the display device 38 to notify an operator at the control center 20 to cause the vehicle 12 to travel to the gas station 18 by remote operation, and on receiving this notification, the operator performs remote operation using the operation interface 34 (see FIG. 5; step S116).

In a cases in which the vehicle 12 is in the garage 16 with the shutter 30 in the closed state (step S112: YES), the CPU 46 transmits operation information for the shutter 30 to the shutter 30 so as to place the shutter 30 in the open state (step S114), and transitions to step S116 once the shutter 30 is in the open state.

The CPU 46 then determines whether or not manual driving operation switchover request information for the vehicle 12 has been generated at the gas station 18 (step S118). In a cases in which manual driving operation switchover request information has been generated (step S118: YES), manual driving operation of the vehicle 12 is permitted and the CPU 46 controls the vehicle control section 76 so as to control the vehicle drive unit 40 based on operation information from the occupant operation information acquisition section 44 (step S120). Processing also transitions to step S122, described later.

In a cases in which manual driving operation switchover request information has not been generated (step S118: NO), the CPU 46 determines whether or not the vehicle maintenance service task at the gas station 18 has been completed (step S122). In a cases in which the vehicle maintenance service task has not been completed (step S122: NO), the CPU 46 returns to the processing of step S118. On the other hand, in a cases in which the vehicle maintenance service task has been completed (step S122: YES), the CPU 46 causes the vehicle 12 to travel toward the garage 16 by remote operation (step S124).

In a cases in which the vehicle 12 has not arrived in the garage 16 (step S126: NO), the CPU 46 returns to the processing of step S124. On the other hand, in a cases in which the vehicle 12 has arrived in the garage 16 (step S126: YES), the CPU 46 closes the shutter 30 of the garage 16 (step S128) and then ends the processing based on the vehicle management program.

Next, explanation follows regarding operation and advantageous effects of the first exemplary embodiment.

As illustrated in FIG. 7, the present exemplary embodiment includes the usage details acquisition section 74, the determination section 106, and the remote operation information control section 96. The usage details acquisition section 74 acquires information regarding the vehicle 12. The determination section 106 determines whether or not a vehicle maintenance service is required based on the information regarding the vehicle 12 acquired by the usage details acquisition section 74. In a cases in which the determination section 106 determines that a vehicle maintenance service is required, implementation of the vehicle maintenance service is proposed. When the time comes for the vehicle maintenance service proposed by the determination section 106 to be implemented, the remote operation information control section 96 uses remote operation to move the vehicle 12 to the gas station 18 for implementation of the vehicle maintenance service. The user is thus spared the effort of moving the vehicle 12 to a predetermined location when a vehicle maintenance service is required. This enables user convenience to be enhanced.

The determination section 106 also determines a low-utilization date/time based on the usage details of the vehicle 12 as acquired by the usage details acquisition section 74. The determination section 106 further determines whether or not a vehicle maintenance service is required based on information regarding the state of the vehicle 12 as acquired by the usage details acquisition section 74. In a cases in which the determination section 106 determines that a vehicle maintenance service is required, a low-utilization date/time is selected as the implementation date/time at which to implement the vehicle maintenance service. The remote operation information control section 96 uses remote operation to move the vehicle 12 to the gas station 18 for implementation of the vehicle maintenance service at the implementation date/time selected by the determination section 106. Accordingly, since the vehicle maintenance service is carried out around a low-utilization date/time as determined from the past usage details of the vehicle 12, situations in which the vehicle 12 is not available to the user at a time when the user wishes to use the vehicle 12 can be reduced. This enables user convenience to be further enhanced.

The determination section 106 determines the availability of the gas station 18 for implementation of the vehicle maintenance service, and this availability is factored into decision-making by the determination section 106 in order to select the implementation date/time. This enables queues for vehicle maintenance services to be suppressed, and thus enables the amount of time required in order to receive the vehicle maintenance service to be kept as short as possible while also contributing to smoothing of the workload at the gas station 18 where the vehicle maintenance service is carried out. This enables the vehicle maintenance service to be carried out more efficiently.

Since the determination section 106 selects the implementation date/time of the vehicle maintenance service so as to take into account a pre-registered usage plan of the vehicle 12 in the plan registration section 84, a situation in which the vehicle 12 is not available when the user wishes to use the vehicle 12 can be avoided. Moreover, selecting the implementation dates/times of vehicle maintenance services so as to prioritize vehicles 12 with more imminent usage plans enables efficient administration. This enables user convenience to be further enhanced.

Moreover, the remote operation information control section 96 is capable of remotely operating opening and closing of the shutter 30 to open and close the entrance of the garage 16 for the vehicle 12. This enables the vehicle maintenance service to be implemented even in a cases in which, for example, the user has gone out and is not near the vehicle 12. This enables user convenience to be further enhanced.

The remote operation information control section 96 permits manual driving operation of the vehicle 12 when this is required by the gas station 18 where the vehicle maintenance service is carried out, thus enabling cases in which it is more appropriate for a vehicle maintenance service task to be carried out by an on-site technician performing a manual driving operation to be accommodated. This enables the vehicle maintenance service to be carried out more efficiently.

Note that although the user uses the user terminal device 26 to register their usage plans for the vehicle 12 in the exemplary embodiment described above, there is no limitation thereto, and configuration may be made such that an implementation date/time selected by the determination section 106 is proposed to the user based on the low-utilization date/time alone.

Figure 9:
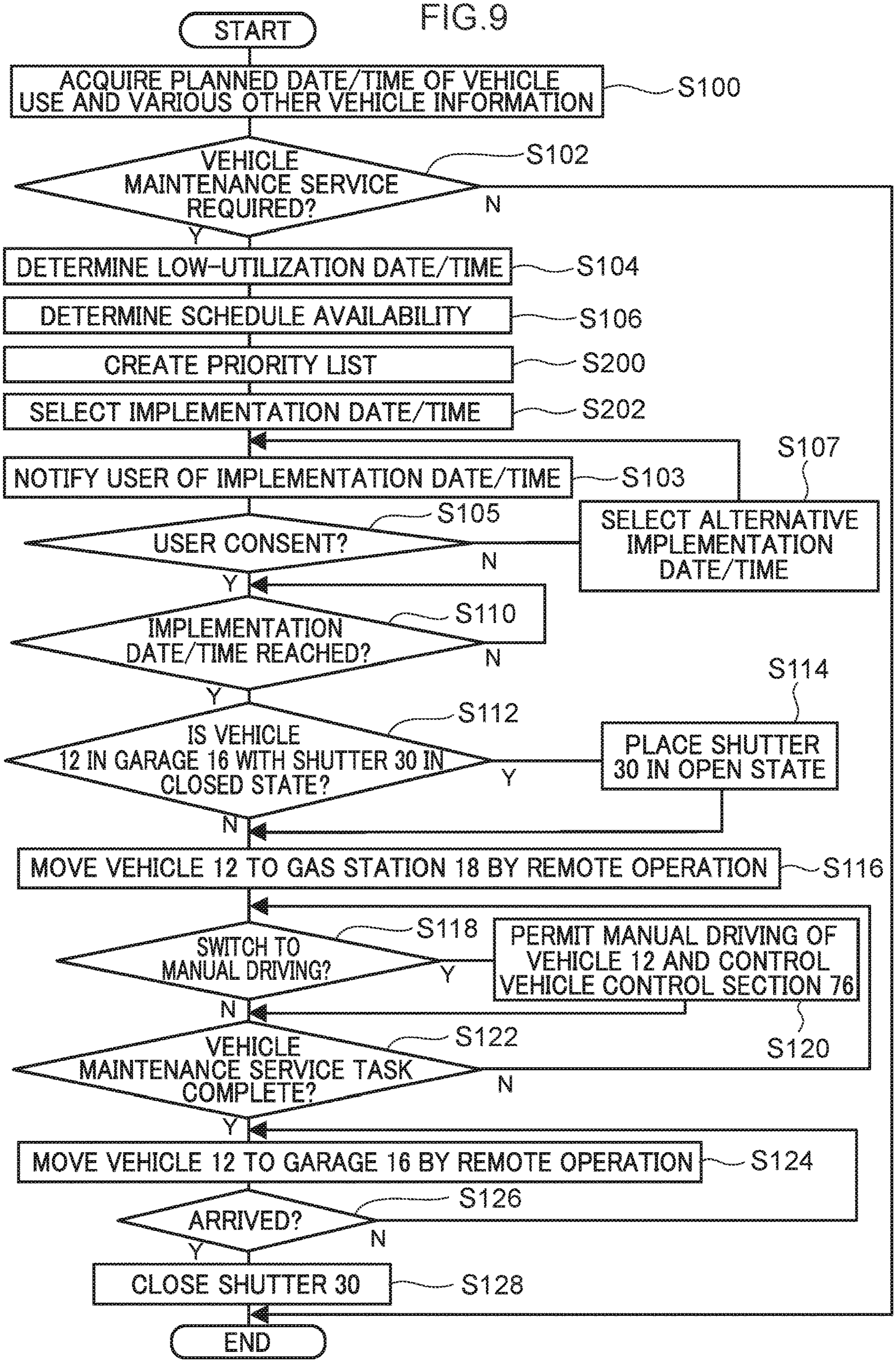
FIG. 9 is a flowchart illustrating a flow of operation of a vehicle management system according to the second exemplary embodiment.

Next, explanation follows regarding a vehicle management system according to a second exemplary embodiment of the present disclosure, with reference to FIG. 7 and FIG. 9. Note that configuration sections matching those of the first exemplary embodiment described above are allocated the same reference numerals, and explanation thereof is omitted.

A vehicle management system 120 according to the second exemplary embodiment has a similar basic configuration to that of the first exemplary embodiment, but includes a feature whereby a server 122 that has a configuration matching that of the server 22 selects an implementation sequence for plural vehicles 12, taking into account information regarding historical implementation dates/times when vehicle maintenance services were implemented. Note that the CPU 46 of the server 122 is an example of a second processor, and the RAM 50 is an example of second memory.

As illustrated in FIG. 7, functional configurations of the server 122 of the vehicle management system 120 include the server control section 104, a determination section 124, and the communication section 108. These functional configurations are implemented by the CPU 46 of the server 122 reading and executing a vehicle management program stored in the ROM 48 or the storage 52 (see FIG. 6).

The determination section 124 determines whether or not a vehicle maintenance service is required for each of the plural vehicles 12 based on the various information acquired by the server control section 104. As an example, the determination section 124 determines a refueling vehicle maintenance service to be required in a cases in which the remaining fuel level of a vehicle 12 is low.

The determination section 124 also determines low-utilization dates/times when the usage frequency of each of the vehicles 12 is low. When a vehicle 12 has been determined to require a vehicle maintenance service, the determination section 124 then determines schedule availability of the gas station 18 based on various information acquired from the server 22, and selects a date/time that is a low-utilization date/time of that vehicle 12 and outside of any usage plan dates/times as input by the user of that vehicle 12, and that also coincides with availability at the gas station 18, as a vehicle maintenance service implementation date/time. If the implementation dates/times of plural of the vehicles 12 clash with each other, information regarding the date/time of the previous vehicle maintenance service (hereafter, referred to simply as the "historical implementation date/time") is acquired for each of the vehicles 12, and a priority list is created in sequence starting from the oldest historical implementation date/time. When selecting the implementation date/time, the vehicles 12 are prioritized according to the list sequence, namely so as to prioritize the vehicle 12 with the oldest historical implementation date/time. The implementation dates/times are then transmitted to the server control section 104. Note that the determination section 124 is pre-registered with task durations for various vehicle maintenance services, and selects each implementation date/time in consideration of the relevant task duration.

Next, explanation follows regarding operation of the vehicle management system 120. FIG. 9 is a flowchart illustrating a flow of operation of the vehicle management system 120. The onboard device 14, the shutter drive control unit 64, the user terminal device 26, the service management unit 32, the remote operation control unit 36, and the server 122 each perform their respective processing by using their respective CPUs 46 to read the vehicle management program from the corresponding ROM 48 or storage 52, and expand and execute this program in the RAM 50. Note that processing that matches that of the first exemplary embodiment is allocated the same reference numerals, and explanation thereof is omitted.

From out of various information acquired from the plural vehicles 12, the CPU 46 creates the priority list in sequence from the oldest historical implementation date/time (step S200). The CPU 46 then uses the priority list to select an implementation date/time corresponding to a date/time when there is availability at the gas station 18 and that is also outside any usage plan of the vehicle by the user (step S202).

Next, explanation follows regarding operation and advantageous effects of the second exemplary embodiment.

With the exception of the point that the implementation sequence is selected so as to take into account the historical implementation dates/times in a cases in which vehicle maintenance services are implemented for plural of the vehicles 12, the configuration described above is similar to the configuration of the vehicle management system 10 of the first exemplary embodiment, and thus obtains similar advantageous effects to those of the first exemplary embodiment. In a cases in which plural of the vehicles 12 are covered, the historical implementation date/time information of the vehicles 12 is acquired and the determination section 124 selects the vehicle maintenance service implementation dates/times so as to take into account this historical implementation date/time information, thereby enabling vehicles 12 with historical implementation dates/times further in the past to be prioritized for vehicle maintenance service implementation. This enables vehicle maintenance service implementation to be balanced evenly between the plural vehicles 12. This enables vehicle maintenance services to be provided in a timely manner for plural vehicles.

Note that in the present exemplary embodiment, the implementation dates/times are selected in sequence starting from the longest elapsed time since the historical implementation date/time, and this is performed irrespective of the type of vehicle maintenance service. However, there is no limitation thereto, and configuration may be made such that implementation dates/times are selected in sequence according to the elapsed time since a historical implementation date/time for each of specific vehicle maintenance services, for example car washing. Alternatively, configuration may be made such that implementation dates/times are selected in sequence starting from the longest elapsed time since a historical implementation date/time only in the case of specific services.

Next, explanation follows regarding a vehicle management system according to a third exemplary embodiment of the present disclosure, with reference to FIG. 6 and FIG. 10 to FIG. 12. Note that configuration sections matching those of the first exemplary embodiment described above are allocated the same reference numerals, and explanation thereof is omitted.

A vehicle management system 126 (see FIG. 11) according to the third exemplary embodiment has a similar basic configuration to that of the first exemplary embodiment, but includes a feature whereby a server 132, with a configuration matching that of the server 22, factors weather information into its decision-making when selecting an implementation date/time.

Figure 10:
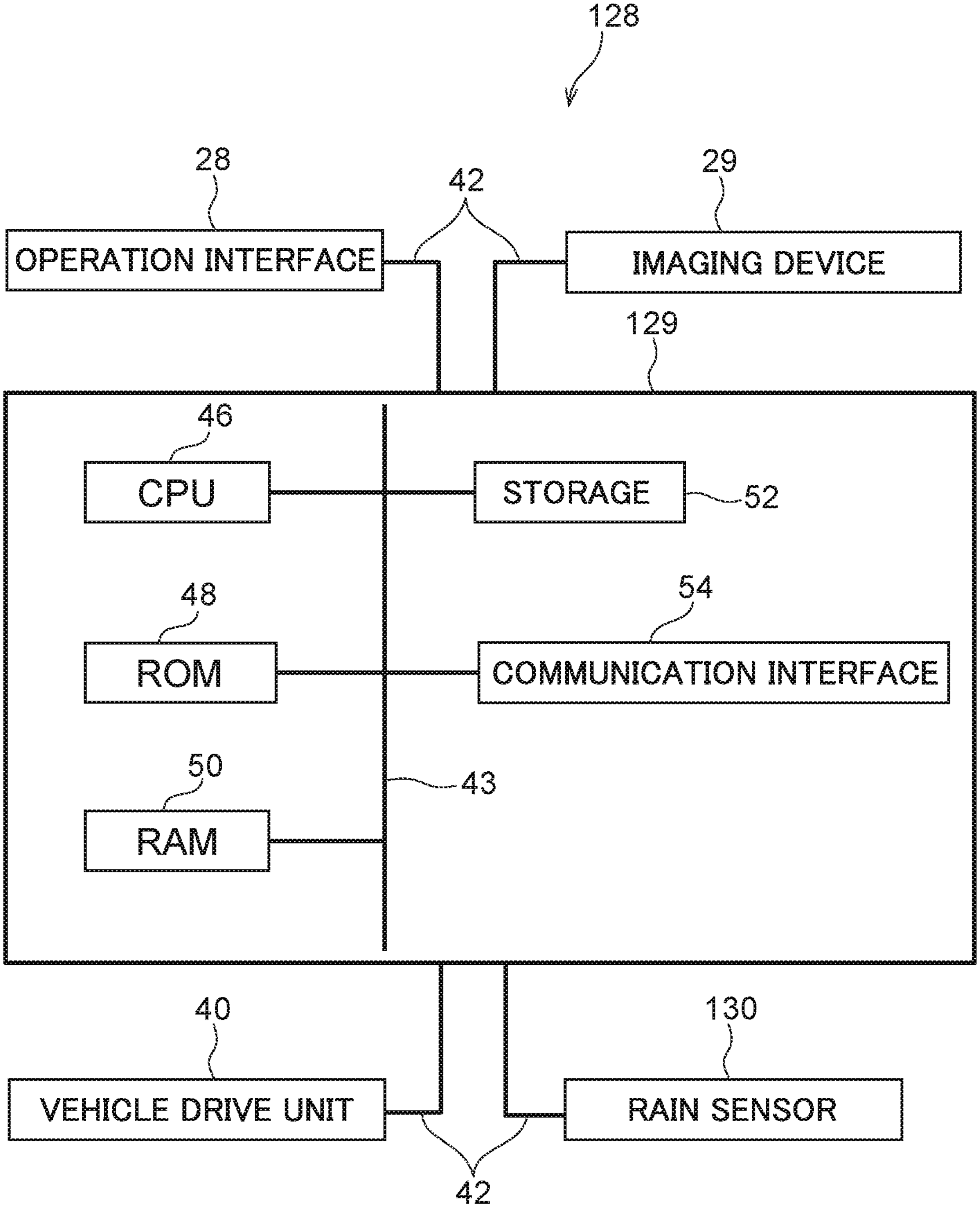
FIG. 10 is a block diagram illustrating a hardware configuration of a vehicle of a vehicle management system according to a third exemplary embodiment.

Namely, as illustrated in FIG. 10, a vehicle 128 includes the operation interface 28, an onboard device 129, the vehicle drive unit 40, the imaging device 29, and a rain sensor 130. These configurations are connected together through a bus 42 so as to be capable of communicating with each other.

As an example, the rain sensor 130 detects water droplets adhering to a front windshield of the vehicle 128, and transmits its detection results to the onboard device 129.

As illustrated in FIG. 6, the server 132 is configured including a CPU 46, ROM 48, RAM 50, storage 52, and a communication interface 54. Each of these configurations are connected together through a bus 43 so as to be capable of communicating with each other. Note that the CPU 46 of the server 132 is an example of a second processor, and the RAM 50 is an example of second memory.

During execution of the vehicle management program described above, the vehicle management system 126 implements various functionality using the hardware resources described above. Explanation follows regarding the functional configurations implemented by the vehicle management system 126.

Figure 11:
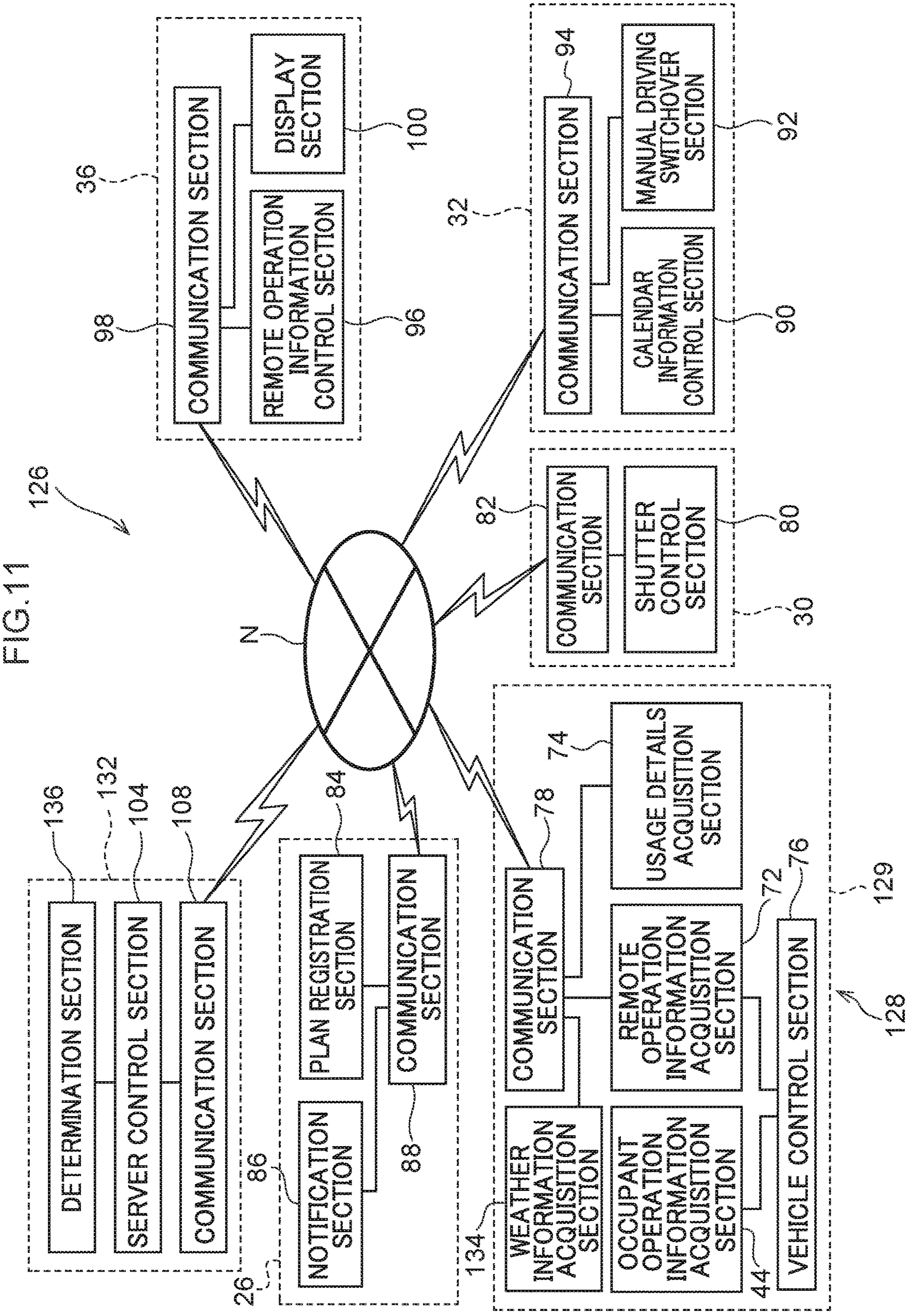
FIG. 11 is a block diagram illustrating functional configurations of a vehicle management system according to the third exemplary embodiment.

FIG. 11 is a block diagram illustrating an example of functional configurations of the vehicle management system 126.

Functional configurations of the onboard device 129 of the vehicle 128 of the vehicle management system 126 include the occupant operation information acquisition section 44, the remote operation information acquisition section 72, the usage details acquisition section 74, the vehicle control section 76, the communication section 78, and a weather information acquisition section 134, serving as a weather acquisition unit. These functional configurations are implemented by the CPU 46 of the onboard device 129 reading and executing a vehicle management program stored in the ROM 48 or the storage 52. Note that the CPU 46 of the onboard device 129 is an example of a first processor, and the RANI 50 is an example of first memory.

The weather information acquisition section 134 determines precipitation based on the water droplet detection results acquired from the rain sensor 130, and controls the communication section 78 in order to transmit information regarding this to the server 132 when precipitation has been determined to be falling.

Functional configurations of the server 132 of the vehicle management system 126 include the server control section 104, a determination section 136, and the communication section 108. These functional configurations are implemented by the CPU 46 of the server 132 reading and executing a vehicle management program stored in the ROM 48 or the storage 52.

The determination section 136 determines whether or not respective vehicle maintenance services are required by the vehicle 128 based on the various information acquired by the server control section 104. As an example, the determination section 136 determines a refueling vehicle maintenance service to be required in a cases in which the remaining fuel level of the vehicle 128 is low.

The determination section 136 also determines low-utilization dates/times when the usage frequency of the vehicle 128 is low. When the vehicle 128 has been determined to require a vehicle maintenance service, the determination section 136 then determines schedule availability of the gas station 18 based on various information acquired from the server 132, and selects a date/time that is a low-utilization date/time of the vehicle 128 and outside of any usage plan dates/times input by the user of the vehicle 128, and that also coincides with availability at the gas station 18, as a vehicle maintenance service implementation date/time. Moreover, in a cases in which the weather information acquisition section 134 has determined that precipitation is falling, an implementation date/time are selected in order to carry out a car washing vehicle maintenance service after the precipitation has ended. The implementation date/time selected by the determination section 136 are then transmitted to the server control section 104. Note that the determination section 136 is pre-registered with task durations for various vehicle maintenance services, and selects each implementation date/time in consideration of the corresponding task duration.

Figure 12:
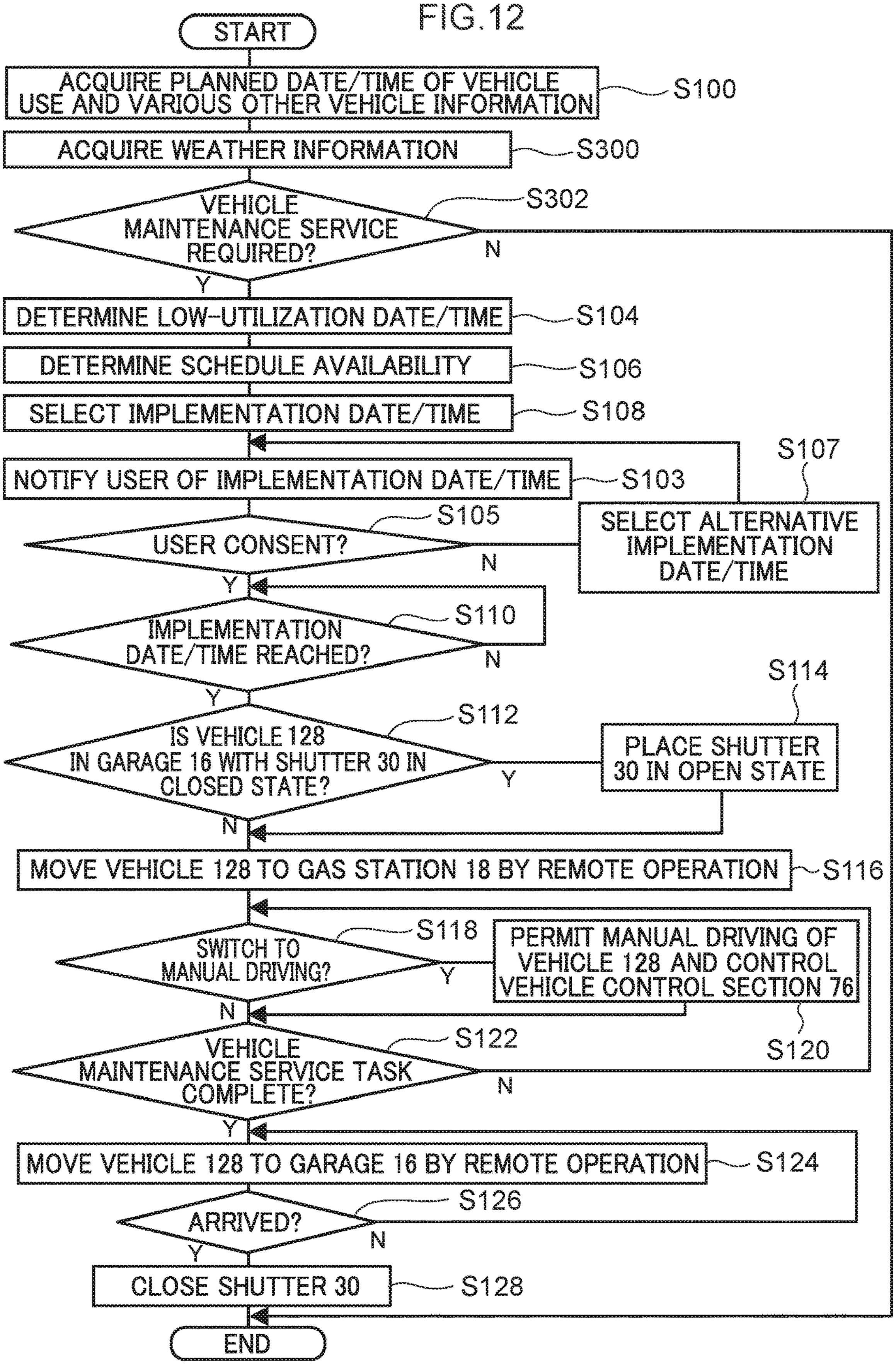
FIG. 12 is a flowchart illustrating a flow of operation of a vehicle management system according to the third exemplary embodiment.

Next, explanation follows regarding operation of the vehicle management system 126. FIG. 12 is a flowchart illustrating a flow of operation of the vehicle management system 126. The onboard device 129, the shutter drive control unit 64, the user terminal device 26, the service management unit 32, the remote operation control unit 36, and the server 122 each perform their respective processing by using their respective CPUs 46 to read the vehicle management program from the corresponding ROM 48 or storage 52, and expand and execute this program in the RANI 50. Note that processing that matches that of the first exemplary embodiment is allocated the same reference numerals, and explanation thereof is omitted.

The CPU 46 acquires the weather information (step S300). The CPU 46 then determines whether or not the vehicle 128 requires a vehicle maintenance service based on the various acquired information and the weather information (step S302). In a cases in which a vehicle maintenance service is not required (step S302: NO), the CPU 46 ends the processing based on the vehicle management program. In a cases in which a vehicle maintenance service is required (step S302: YES), the CPU 46 transitions to the processing of step S104.

Next, explanation follows regarding operation and advantageous effects of the third exemplary embodiment.

With the exception of the point that the weather information is also factored into decision-making when selecting the implementation date/time, the configuration described above is similar to the configuration of the vehicle management system 10 of the first exemplary embodiment, and thus obtains similar advantageous effects to those of the first exemplary embodiment. Moreover, since the weather information for the current location of the vehicle 128, as acquired by the weather information acquisition section 134, is also factored into decision-making by the determination section 136 when selecting the implementation date/time of a vehicle maintenance service, the vehicle maintenance service required by the vehicle 128 can be implemented at an appropriate timing according to the weather. As a rule, the exterior of the vehicle 128 will often get dirty when traveling in the rain. Due to the determination section 136 making a selection so as to carry out car washing after the precipitation has ended and by then carrying out this car washing, the vehicle 128 can be kept clean. This enables the vehicle 128 to be maintained in a desirable state.

Note that in the first to third exemplary embodiments described above, the gas station 18 is employed as the location where vehicle maintenance services are carried out. However, there is no limitation thereto, and another location such as a car dealership or a servicing workshop may be applied as the location for vehicle maintenance service implementation. Moreover, vehicle maintenance services may be carried out at plural locations depending on the service contents and scheduling.

Although the garage 16 is provided with the shutter 30, there is no limitation thereto, and the vehicle entrance may be configured by an opening and closing door, or configuration may be made including neither the shutter 30 nor a door. The vehicle 12 may also be stored at a location other than the garage 16.

Although explanation has been given regarding exemplary embodiments of the present disclosure, the present disclosure is not limited to the above, and obviously various other modifications may be implemented within a range not departing from the spirit of the present disclosure.

What is claimed is:

1. A vehicle management system comprising:

an onboard device:

a server; and a remote operation control unit, the onboard device including a first memory and a first processor coupled to the first memory, the first processor being configured to acquire information regarding a vehicle:

the server including a second memory and a second processor coupled to the second memory, the second processor being configured to determine whether or not a vehicle maintenance service is required based on the acquired information, and to propose implementation of the vehicle maintenance service in a case in which the vehicle maintenance service is required; and the remote operation control unit including a third memory and a third processor coupled to the third memory, the third processor being configured to use remote operation to move the vehicle to a predetermined location for implementation of the vehicle maintenance service in a case in which the proposed vehicle maintenance service is to be implemented, wherein the remote operation control unit is connected to an operation interface via a bus, and the third processor acquires operation information regarding operation of the operation interface by an operator, wherein the first processor is configured to acquire information regarding usage details of the vehicle and a state of the vehicle, wherein the second processor is configured to determine a low-utilization date/time when a usage frequency of the vehicle is anticipated to be low based on the acquired information regarding the usage details of the vehicle, to determine whether or not the vehicle maintenance service is required based on the acquired information regarding the state of the vehicle, and to select the low-utilization date/time as an implementation date/time to implement the vehicle maintenance service in a case in which the vehicle maintenance service is required, wherein the second processor is configured to acquire a historical implementation date/time of a most recent implementation of a previous vehicle maintenance service for the vehicle and plural other vehicles, and create a priority list in sequence from an oldest historical implementation date/time for the vehicle and the plural other vehicles, wherein the second processor is configured to factor the priority list and a registered usage plan in a plan registration section that allows a user of the vehicle to pre-register a usage plan of the vehicle into decision-making when selecting the implementation date/time, and the second processor selects the implementation date/time so as to prioritize vehicles with more imminent usage plans and the oldest historical implementation date/time, and the third processor is configured to use remote operation to move the vehicle to the predetermined location for implementation of the vehicle maintenance service at the implementation date/time.

2. The vehicle management system of claim 1, wherein the second processor is configured to determine an availability state at the predetermined location for implementation of the vehicle maintenance service and to factor the availability state into decision-making when selecting the implementation date/time.

3. The vehicle management system of claim 1, wherein the third processor is capable of remotely operating opening and closing of a door that opens and closes a vehicle entrance of a storage facility for the vehicle.

4. The vehicle management system of claim 1, wherein the third processor is configured to permit a manual driving operation of the vehicle at the predetermined location as required.

5. The vehicle management system of claim 1, wherein the second processor selects an implementation date/time to implement a car wash, which is one of the vehicle maintenance services, based on weather information acquired by a weather acquisition unit that determines that the vehicle has traveled during rain by acquiring water droplet detection results from a rain sensor mounted at the vehicle as weather information for a current location of the vehicle, so that the car wash is performed after the vehicle receives rainfall.

6. A server comprising:

a memory; and a processor coupled to the memory, the processor being configured to:

determine whether or not a vehicle maintenance service is required based on information acquired from a vehicle subject to remote operation by a remote operation control unit, and to propose implementation of the vehicle maintenance service in a case in which the vehicle maintenance service is required; and transmit operation information to move the vehicle by remote operation to a predetermined location for implementation of the vehicle maintenance service in a case in which the proposed vehicle maintenance service is to be implemented, wherein the remote operation control unit is connected to an operation interface via a bus, the remote operation control unit comprises a second processor, and the second processor acquires operation information regarding operation of the operation interface by an operator, wherein the processor is configured to determine a low-utilization date/time when a usage frequency of the vehicle is anticipated to be low based on the information acquired from the vehicle, to determine whether or not the vehicle maintenance service is required based on the acquired information, and to select the low-utilization date/time as an implementation date/time to implement the vehicle maintenance service in a case in which the vehicle maintenance service is required, wherein the processor is configured to acquire a historical implementation date/time of a previous vehicle maintenance service for the vehicle and plural other vehicles, and create a priority list in sequence from an oldest historical implementation date/time for the vehicle and the plural other vehicles, wherein the processor is configured to factor the priority list and a registered usage plan in a plan registration section that allows a user of the vehicle to pre-register a usage plan of the vehicle into decision-making when selecting the implementation date/time, and the processor selects the implementation date/time so as to prioritize vehicles with more imminent usage plans and the oldest historical implementation date/time, and wherein the second processor is configured to use remote operation to move the vehicle to the predetermined location for implementation of the vehicle maintenance service at the implementation date/time.

* * * * *